March 28, 1967 A. BONTEMPO 3,311,709

MULTIDIGIT REGISTER CIRCUIT HAVING RANDOM INTERROGATING MEANS

Filed March 20, 1964 2 Sheets-Sheet 1

INVENTOR
A. BONTEMPO
BY D. E. Snedeker
ATTORNEY

March 28, 1967 A. BONTEMPO 3,311,709

MULTIDIGIT REGISTER CIRCUIT HAVING RANDOM INTERROGATING MEANS

Filed March 20, 1964 2 Sheets-Sheet 2

United States Patent Office 3,311,709
Patented Mar. 28, 1967

3,311,709

MULTIDIGIT REGISTER CIRCUIT HAVING RANDOM INTERROGATING MEANS

Andrew Bontempo, Bayshore, N.Y., assignor to American Telephone and Telegraph Company, New York, N.Y., a corporation of New York Filed Mar. 20, 1964, Ser. No. 353,397
14 Claims. (Cl. 179—18)

Figure 1:
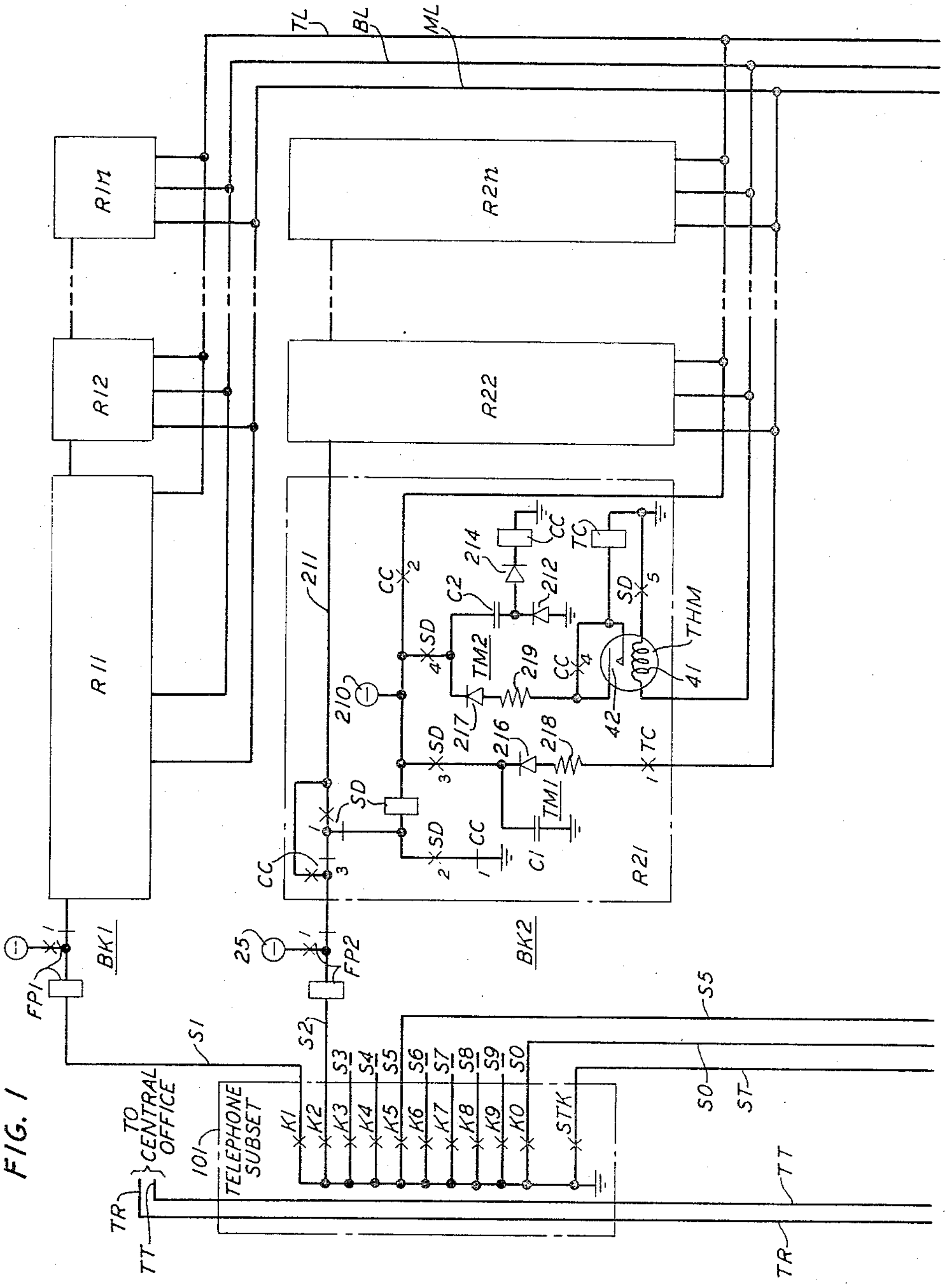

This invention relates to multidigit register circuits and more particularly to such circuits for registering a plurality of successive digits and for transmitting the digits in the same order in which they are registered. A general object of this invention is to provide an improved multidigit register circuit which may be employed advantageously in the telephone art to register successive keyed digits and to transmit corresponding digit series of impulses.

Control of conventional automatic telephone switching systems to establish connections between calling and called line is effected directly or indirectly by digits generated at calling subscriber or operator equipment. Generally these digits are generated in the form of discrete series of direct-current pulses, such as through the use of the familiar telephone rotary dial, each series of pulses corresponding in number to the value of the particular digit dialed. For satisfactory control of most of the relatively slow moving electromechanical switching equipment in present systems, the dial pulses are generated at a correspondingly slow rate by the dial equipment, for example, at a rate on the order of ten pulses per second.

The rate of digit generation may be much faster, however, where key or pushbutton operated equipment is employed rather than rotary dial equipment, such as in a system employing TOUCH-TONE calling. Where the digits are to be directed to conventional dial pulse controlled switching equipment, circuitry must be provided for registering the high speed keyed digits and for transmitting these digits to the switching equipment in the form of relatively slow speed direct-current dial pulses. Multidigit storage registers for this purpose are known in the telephone art comprising a plurality of digit registers into which the individual keyed digits are registered in succession. The digit registers are subsequently interrogated sequentially to read out the registered digits to a converter circuit for generation of corresponding series of dial pulses. Since the digits are registered in the digit registers in succession, and the registers are interrogated in sequence, each digit register must have the capacity for registering any digit value which may be keyed; i.e., any decimal digit value between 0 and 9.

Accordingly, it is an object of this invention to eliminate the necessity in known multidigit register circuits for registering successive digits in successive digit registers and to eliminate the necessity for interrogating the digit registers in a predetermined sequential order.

More particularly, it is an object of this invention to provide a multidigit register circuit comprising a plurality of digit registers in which digits may be registered in random order and from which they may be subsequently read out selectively in the same order as they were registered.

Another object of this invention is to provide a multidigit register circuit in which each digit register thereof need have the capacity for registering only a single particular digit value, eliminating the prior art requirement that each digit register have the capacity for registering any digit value which may be directed to the register circuit.

It is a further object of this invention to provide a simple and economical multidigit register circuit for registering digits at a first rate and for transmitting the digits at a second rate.

The foregoing and other objects are attained in an illustrative embodiment of a multidigit register circuit arranged to register digits keyed by a telephone subscriber or operator and to read out the digits to switching equipment under conditions where the rate of digit registration may be relatively fast compared to the rate of interrogation and readout. Each input digit to the multidigit register circuit is registered in a digit register associated with the particular value of the digit, and the digit registers are interrogated selectively in the order of digit registration therein to read out the digits for conversion into dial pulses. The individual digit registers thus need have the capacity for registering only a particular digit value with which it is associated, rather than the value of any digit which may be directed to the multidigit register circuit.

In accordance with one aspect of the present invention, selective interrogation of the individual digit registers is effected by the operation of a novel gating arrangement in which an interconnected group of delayed action switching elements functions as the sequencing mechanism. Specifically, each digit register has associated therewith an individual delayed action switching element, operation of which is initiated by registration of a digit in the associated digit register. The switching element, after a predetermined time delay, interrogates the associated digit register to read out the digit registered therein for conversion into a corresponding series of dial pulses. The delay afforded by each switching element is substantially identical and, consequently, the digits are read out of the digit registers in the same order as operation of the associated switching elements is initiated; i.e., the order of registration of the digits in the digit registers. Each switching element is connected in common to circuitry which is responsive to the reading out of a digit from a digit register to temporarily inhibit the timing operation of all other switching elements, thereby precluding interrogation of more than one digit register at a time.

In accordance with another aspect of the present invention the delayed action switching elements each include a thermally activated element having a heating coil which is energized by registration of a digit in the associated digit register, and having a corresponding switch which operates to interrogate the associated digit register when the heating coil reaches a specific operating temperature. The thermal characteristics of all of the elements are substantially similar so that the time required for the heating coils to reach the specific temperature and operate the corresponding switches is essentially the same. Consequently, the corresponding switches will be operated to interrogate the digit registers in the same order as the order in which the heating coils are energized. The heating coils of all of the elements are connected to a common battery through a variable impedance which is normally in a low impedance condition. When one of the element switches operates to interrogate the associated digit register, the variable impedance is placed in a high impedance condition to limit the current to the heating coils to a value sufficient only to maintain these coils at a constant temperature. Upon completed readout of the digit from the digit register, the variable impedance is returned to a low impedance condition, whereupon the temperature of the remaining energized heating coils begins to rise again until one of these coils reaches the specific operating temperature necessary to close its corresponding switch for interrogating the associated digit register. This process continues until all of the digit registers have been interrogated.

It is therefore a feature of this invention that a multidigit register circuit comprise a plurality of registers individually associated with a particular digit value and operable to register digits of that value, and circuitry for interrogating the individual registers selectively in the same order as the order of digit registration therein.

Another feature of this invention relates to time-out circuitry individually associated with each of a plurality of digit registers for interrogating the associated individual register upon timeout and to circuitry responsive to the order of registration of digits in the digit registers for selectively controlling the timing interval of the time-out circuitry associated with each of the digit registers.

A further feature of this invention is directed toward circuitry for selectively interrogating a plurality of digit registers comprising delayed action interrogation circuits individually associated with each of the registers and for circuitry for controlling the delay of the individual interrogation circuits in accordance with the number of registers having digits registered therein.

Figures 2, 3:
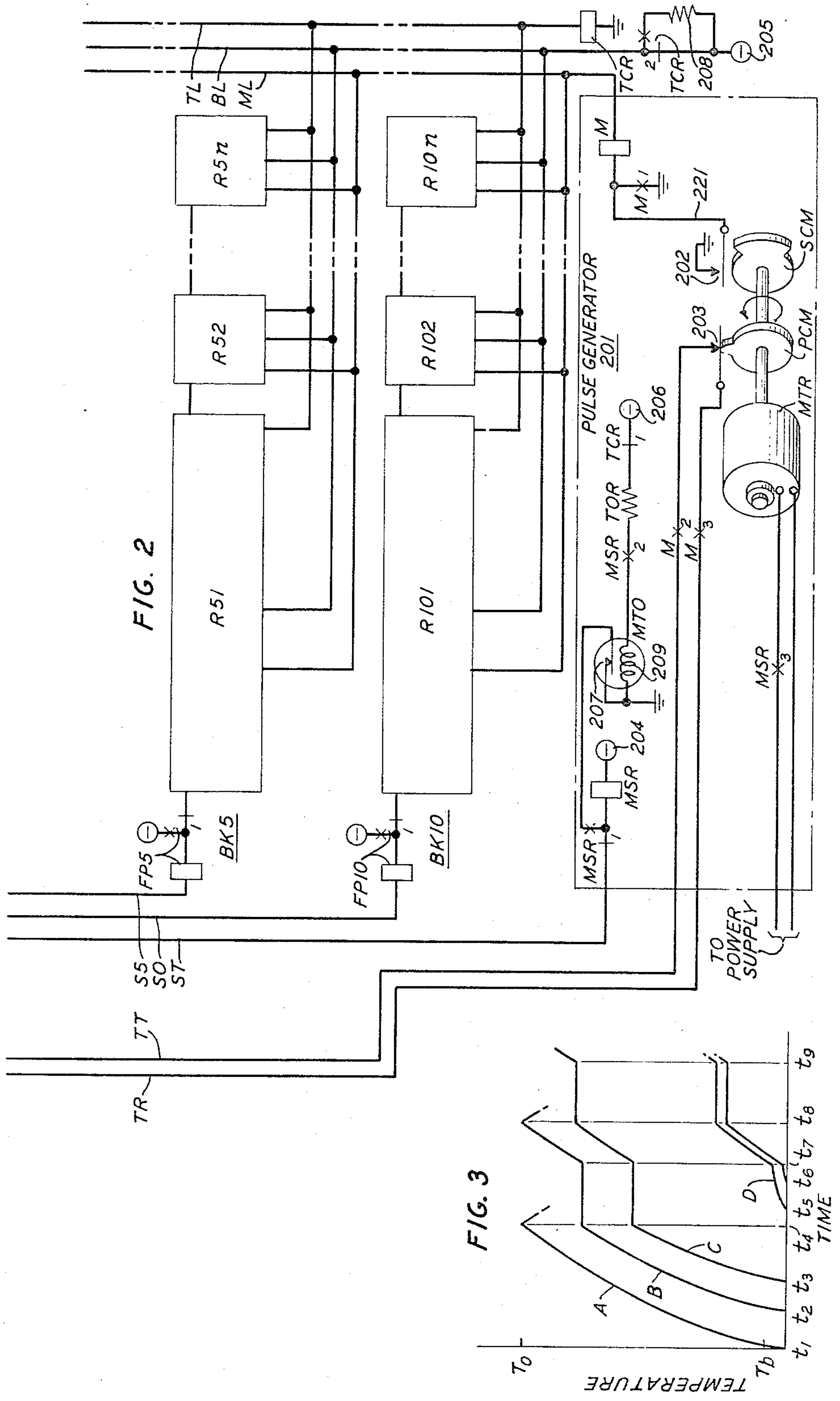

A more complete understanding of this invention together with the above and other objects and features thereof may be gained from a consideration of the following detailed description and accompanying drawing, in which:

FIGS. 1 and 2, when FIG. 2 is arranged below FIG. 1, show an illustrative embodiment of a multidigit register circuit in accordance with the principles of the present invention; and FIG. 3 is a graphical representation indicating the operation of a portion of the illustrative embodiment of FIG. 1.

The specific embodiment of the present invention shown in FIGS. 1 and 2 is depicted, by way of illustration, in an application in the telephone art for registering successive digits keyed by telephone subscriber equipment and for transmitting these digits in the form of conventional dial pulses to central office switching equipment controlled thereby. Thus the multidigit register circuit in the illustrative embodiment of FIGS. 1 and 2 is interposed between telephone subscriber's subset 101, which may be representative of a plurality of such subsets sharing the register circuit, and pulse generator 201. The output of pulse generator 201 is connected via the tip and ring conductors TT and TR of the subscriber's line to central office switching equipment (not shown). For the purposes of clarity and to facilitate description, only so much of the circuitry of subset 101 as is deemed necessary for a complete understanding of the present invention is shown in the drawing. Digit contacts K1 through K0 in subset 101 each correspond to a decimal digit value which a subscriber may select in placing a call and transmit through the use of digit keys or pushbuttons (not shown). Start contact STK is operated when subscriber subset 101 goes off-hook to initiate a call. Each of digit contacts K1 through K0 and start contact STK is connected in common to ground and individually to a respective one of signaling leads S1 thorugh S0 and start lead ST. These contacts, along with the relay circuitry in the drawing, are shown in the well-known detached contact form, a make contact being represented by a pair of lines intersecting on a conductor, a break contact being represented by a single line perpendicularly intersecting a conductor, and a relay coil being represented by a block.

The multidigit register circuit in accordance with the present invention comprises a plurality of digit registers R11 through R10*n* arranged in digit register banks BK1 through BK10. Only digit register banks BK1, BK2, BK5 and BK10 are shown in the drawing for purposes of clarity. The digit registers in each digit register bank are associated with a particular decimal digit value, and are connected over a respective one of signaling leads S1 through S0 to the correspondingly valued digit contact in subset 101. Thus, digit registers R11 through R1*n* in digit register bank BK1 are connected over lead S1 to digit contact K1 in subset 101, digit registers R21 through R2*n* in bank BK2 are connected through lead S2 to digit contact K2, and so forth. The number of digit registers required in each digit register bank will depend principally upon the rate of registration relative to the rate of interrogation, but it will also depend upon the number of repetitions of a particular digit value which may appear in a cycle of operation, as will be apparent from the description hereinbelow. The number of digit registers in each bank need not be equal.

Each of the digit registers is substantially similar in structure and operation and, accordingly, only one digit register, viz., digit register R21, is shown in detail in the drawing. Digit register R21, and each of the other digit registers, essentially comprises a digit register relay SD, a delayed action switching element THM, and a pair of timing circuits TM1 and TM2. The delayed action switching element THM advantageously may comprise a thermocouple tube, as represented in the drawing, having a heating coil 41 and associated normally-open switch 42. As is known in the art, when current is applied to heating coil 41, the temperature in the thermocouple tube is increased. When a specific temperature is reached, after a time delay determined by the magnitude of the current and the characteristics of the thermocouple tube, associated switch 42 closes to provide a path therethrough. The characteristics of each of the thermocouple tubes in the digit registers are assumed to be substantially identical, and thus the time in which any tube will reach the specific temperature necessary to operate its associated switch for a given heating coil current will be substantially the same for all of the thermocouple tubes.

One side of heating coil 41 of element THM is connected to ground through make contact 5 of digit register relay SD. The other side of heating coil 41 is connected, in common with the corresponding heating coils in each of the other digit registers, to source 205 over lead BL through the break portion of transfer contact 2 of relay TCR. When relay TCR is energized, as during the interrogation of one of the digit registers in the manner described in detail below, resistor 208 is connected between source 205 and lead BL via the make portion of transfer contact 2 of relay TCR. When resistor 208 is connected in circuit with the thermocouple tube heating coils, the current provided thereto by source 205 over lead BL is limited to a value sufficient only to maintain the temperature of the thermocouple tubes at a substantially constant level, but not sufficient to increase the temperature therein. Thus, while relay TCR is energized, connecting resistor 208 in the current path of the heating coils, the timing operation of all of the thermocouple tubes is temporarily inhibited. This precludes the interrogation of more than one of the digit registers at a time.

As mentioned above, each digit register comprises a pair of timing circuits TM1 and TM2. Timing circuit TM2, including capacitor C2 and resistor 219, is substantially the same for each digit register and functions to define an interrogation or readout interval for the digit register. Timing circuit TM1, including capacitor C1 and resistor 218, is substantially the same for each digit register in a given digit register bank, but is different for each digit register bank. Timing circuit TM1 functions to define a digit value interval corresponding to the particular digit value with which the digit register is associated. This may be effected for example by providing resistor 218 with a proportionately different value for each digit register bank.

Timing circuit TM1 of each digit register is connected in common over output lead ML to pulse generator 201. When a digit register is interrogated to read out a digit registered therein, a digit value signal is provided to pulse generator over lead ML by timing circuit TM1. The duration of the signal on lead ML varies in correspondence with the particular digit value registered in the digit register being interrogated. Pulse generator 201 may comprise any known circuitry or apparatus for converting such signals on lead ML into corresponding digit series of dial pulses on tip and ring conductors TT and TR. In the specific illustrative embodiment shown in the drawing, pulse generator 201 comprises a motor MTR driving a pulse cam PCM and a sync cam SCM. Pulse cam PCM operates output contact 203 at a rate in accordance with the desired dial pulse rate, for example 10 contact operations per second for a dial pulse rate of 10 pulses per second. Sync cam SCM and associated sync contact 202 are provided to insure that the correct number of dial pulses is generated on conductors TT and TR, regardless of the rotational position of pulse cam PCM when interrogation of a digit register is initiated. The operation of motor MTR is controlled by motor start relay MSR and motor time-out device MTO, operation of motor MTR being initiated by a signal on start lead ST from subset 101 and being terminated upon timeout of device MTO. Motor time-out device MTO advantageously may comprise a thermocouple tube, as illustratively shown in the drawing, having a heating coil 209 and an associated normally closed switch 207.

Assume, for the purpose of illustrating the operation of the present invention, that a subscriber using subset 101 wishes to call a subscriber having the telephone number 212–252–2220. When subset 101 goes off-hook, start contact STK is operated to extend ground over lead ST through the break portion of transfer contact 1 and the winding of motor start relay MSR to source 204. Motor start relay MSR is energized in this path and locks up over a path from source 204, through the winding of relay MSR, the make portion of operated contact 1 of relay MSR, and normally closed switch 207 of motor time-out device MTO to ground. Operated make contact 2 of relay MSR completes a path from ground through heating coil 209, resistor TCR and break contact 1 of relay TCR to source 206, current thus being provided through heating coil 209 to increase the temperature in motor time-out device MTO. The operation of motor time-out device MTO is similar to that of switching element THM except that associated switch 207 is normally closed until device MTO reaches a specific operating temperature, whereupon switch 207 opens to break the path therethrough, releasing relay MSR. This occurs when interrogation of the multidigit register circuit has been completed, as will be described hereinbelow.

Contact 3 of relay MSR operates to extend power to energize motor MTR. Rotation of energized motor MTR is transmitted to pulse cam PCM and sync cam SCM, pulse cam PCM accordingly operating output contact 203 once for each revolution. As mentioned above, the periodic operations of contact 203 to generate output pulses on tip and ring conductors TT and TR advantageously occur at the rate desired for transmission of the dial pulses. However, the closures of contact 203 are not extended to conductors TT and TR at this time inasmuch as relay M is not energized.

The calling subscriber proceeds to select and operate the digit keys or pushbuttons at subset 101 sequentially in the normal manner in accordance with the telephone number of the called subscriber. The first digit key operated by the calling subscriber, namely the digit key corresponding to the digit "2," momentarily closes digit contact K2 until the digit key is released. Closure of contact K2 extends ground over signaling lead S2 through the winding of relay FP2, the break portion of transfer contact 1 of relay FP2, the break portion of transfer contact 3 of relay CC, the break portion of transfer contact 1 of relay SD and the winding of relay SD to source 210. Relays FP2 and SD are energized in this path, relay SD locking up via an obvious path through its make contact 2 and break contact 1 of relay CC to ground. Relay FP2 locks up through the make portion of its transfer contact 1 to source 25. Relay FP2 remains energized until digit contact K2 in subset 101 is released. The break portion of transfer contact 1 of relay FP2 operates to prevent the ground on lead S2 from being extended to lead 211 and thus to digit register R22 unless digit contact K2 is released and operated a second time. Relay FP2 thus prevents the improper registration of a digit in more than one digit registers in digit register bank BK2 for a single operation of digit contact K2.

Upon release of digit contact K2 and thus relay FP2, if a subsequent digit "2" is keyed at subset 101 before the digit registered in register R21 is read out, the break portion of transfer contact 1 of relay SD prevents such subsequent digit from affecting the operation of register R21. The make portion of transfer contact 1 of relay SD extends any subsequent digit "2" therethrough to lead 211 for registration in another digit register in digit register bank BK2, such as digit register R22. Transfer contact 3 of relay CC serves similar functions with respect to any subsequent digit "2" which is keyed during interrogation of digit register R21, as described below.

Energization of digit register relay SD in registering a digit in digit register R21 connects source 210 to timing circuits TM1 and TM2 through operated make contacts 3 and 4, respectively. Capacitor C1 in timing circuit TM1 charges toward source 210, the path therefor being traced from ground through capacitor C1 and operated make contact 3 of relay SD to source 210. The charging path for capacitor C2 in timing circuit TM2 extends from source 210 through operated make contact 4 of relay SD, capacitor C2 and diode 212 to ground. Diode 214 is poled so as to prevent operation of relay CC at this time.

Contact 5 of relay SD operates to complete a path from ground through heating coil 41 of delayed action switching element THM over lead BL and through the break portion of transfer contact 2 of relay TCR to source 205. The temperature of element THM is consequently increased by the current through coil 41 in the manner depicted by curve A in FIG. 3. Time $t_1$ corresponds to the operation of digit contact K2, resulting in the closure of contact 5 of relay SD in register R21, completing the current path through heating coil 41. The temperature of element THM continues to increase, as shown in curve A, toward its specific operating temperature $T_0$. During this time the subscriber may be operating other digit keys at subset 101 to register subsequent digits of the called number in the other digit registers, such as represented by curves B and C in FIG. 3. More particularly, it is assumed for the purposes of illustration that the calling subscriber keys the second digit of the called number at time $t_2$, thus operating digit contact K1 to extend ground over signaling lead S1 to register the digit "1" in digit register R11. A delayed action switching element in register R11, corresponding to the switching element THM in register R21, is energized thereby and increases in temperature toward its specific operating temperature $T_0$, as depicted by curve B in FIG. 3.

At some subsequent time $t_3$, which may be before element THM in register R21 has reached temperature $T_0$, as shown in FIG. 3, the calling subscriber keys the third digit of the called number; namely, the digit "2" in the illustrative example. Operation of digit contact K2 again extends ground over signaling lead S2 and through the winding of relay FP2 to register R21. However, since a digit is already registered in register R21, which has not been read out, the ground on lead S2 is extended through the break portion of transfer contact 3 of relay CC and the make portion of operated transfer contact 1 of relay SD over lead 211 to digit register R22. A digit register relay in register R22, corresponding to relay SD in register R21, is operated thereby to register the digit and to initiate operation of the delayed action switching element in register R22. Consequent temperature increase of the switching element in register R22 is depicted by curve C in FIG. 3.

Similarly, the calling subscriber continues to key the other digits of the called number in succession, each digit being registered in a respective one of the digit registers and initiating operation of the switching elements therein in the manner described above. The fourth digit of the illustrative called number is thus registered in digit register R23 (not shown), the fifth digit in register R51, the sixth in register R24 (not shown), and so forth, the last digit being registered in digit register R101. Any number or all of the digits of the called number may be keyed and registered in the respective digit registers before interrogation and readout of digit register R21 is effected, and the time interval between the keying of successive digits may be uniform or random. In any event, the subsequent interrogation of the various registers having digits registered therein is performed in the same order as the order in which the digits are registered. Accordingly, the first digit register to be interrogated in the illustrative example is digit register R21.

Interrogation of digit register R21 is initiated by closure of switch 42 upon switching element THM reaching its specific operating temperature $T_0$. When element THM reaches temperature $T_0$, at time $t_4$ in FIG. 3, switch 42 closes to complete a discharge path for capacitor C2 in timing circuit TM2. This path may be traced from ground through the winding of relay TC, switch 42, resistor 219, diode 217, capacitor C2, diode 214 and the winding of relay CC to ground. Relays CC and TC are energized in this path, contact 1 of relay CC operating to break the locking path for digit register relay SD, thereby releasing relay SD. The path between signaling lead S2 and lead 211 to the other digit registers in bank BK2 is maintained upon release of relay SD, by the make portion of the operated transfer contact 3 of relay CC. This permits registration in one of the other digit registers in bank BK2 of any subsequent digit "2" which may appear on lead S2 before readout of register R21 is completed. The break portion of transfer contact 3 of relay CC prevents such subsequent digits from being registered in register R21. Relay CC is released upon completion of interrogation and readout of register R21.

It will be noted that release of contact 5 of relay SD breaks the current path for heating coil 41 of element THM. The temperature of element THM thus decreases toward ambient temperature thereby releasing associated contact 42. The above-traced discharge path for capacitor C2 is maintained, however, by operated make contact 4 of relay CC which is connected in parallel with switch 42.

Returning then to the interrogation of digit register R21, release of contacts 3 and 4 of digit register relay SD removes source 210 from timing circuits TM1 and TM2, respectively. Contact 1 of relay TC operates to connect timing circuit TM1 to output lead ML. Relay TC is slow to operate to ensure that relay SD has released to remove source 210 from timing circuit TM1 before contact 1 of relay TC is operated. Connection of timing circuit TM1 to output lead ML initiates a discharge path for capacitor C1, the initial portion thereof being traced from ground through capacitor C1, diode 216, resistor 218 and operated contact 1 of relay TC to lead ML. Output lead ML is connected to pulse generator 201 and therein through the winding of relay M over lead 221 to sync contact 202. The discharge path for capacitor C1 is completed upon closure of contact 202 by sync cam SCM to connect lead 221 to ground. As shown in the drawing, closure of contact 202 occurs at a time during the rotation of cams PCM and SCM when output contact 203 is open. Completion of the above-traced path through operation of sync contact 202 energizes output relay M which locks up to ground through its operated make contact 1. Operated contacts 2 and 3 of relay M connect output contact 203 to leads TT and TR. Relay M is maintained energized until capacitor C1 has discharged.

As described above, the time interval during which an output signal is provided on lead ML by the discharge of capacitor C1 in timing circuit TM1, and thus the time during which output relay M is maintained energized, corresponds to the particular digit value with which the digit register is associated. Digit register R21 is associated with decimal digit "2," the value of the digit registered therein. Therefore the values of capacitor C1 and resistor 218 in timing circuit TM1 are chosen such that relay M is maintained energized thereby for an interval sufficient for the rotation of pulse cam PCM to effect two closures of output contact 203. Consequently, a series of two pulses representative of the digit "2," are provided on leads TT and TR at the pulse rate determined by the rotation of motor MTR and pulse cam PCM. Subsequent to the second closure of contact 203 and prior to a third, capacitor C1 will be discharged to a level insufficient to maintain relay M energized. Relay M releases contacts 2 and 3 thereof breaking the connection between output contact 203 and leads TT and TR.

The digit register interrogation interval provided by the discharge of capacitor C2 in timing circuit TM2 is greater than the digit value timing interval provided by timing circuit TM1 and is sufficient to permit delayed action switching element THM to return to ambient temperature. Thus when capacitor C2 has discharged to a level insufficient to maintain relays CC and TC energized, these relays release and digit register R21 is returned to its initial state to permit registration of a subsequent digit "2" therein.

During the interrogation of one of the digit registers, the timing operation of the switching elements in the other digit registers in which digits are registered must be temporarily inhibited to preclude any other digit register from being interrogated until the one digit register readout has been completed. This is effected, it will be recalled, by the provision of relay TCR and resistor 208. When interrogation of digit register R21 is initiated, operation of make contact 2 of relay CC extends source 210 over lead TL to energize relay TCR. Upon operation of transfer contact 2 of relay TCR, resistor 208 is connected in circuit between source 205 and lead BL connected to the heating coils of the switching elements in each of the other digit registers. Accordingly, the current provided over lead BL to the switching elements in the other digit registers is reduced to a value sufficient only to maintain the temperature level of the switching elements substantially constant and insufficient to increase the temperature level thereof. The reduced current level on lead BL is maintained until the interrogation of digit register R21 is completed and relay CC is released, release of contact 2 of relay CC releasing relay TCR. Release of relay TCR, represented at time $t_7$ in FIG. 3, removes resistor 208 from the circuit path between source 205 and lead BL.

The reduced current level on lead BL during interrogation of one of the digit registers, as mentioned above, is of a value sufficient to maintain the temperature level of the switching elements in the other digit registers substantially constant. However, when the temperature level of a switching element is below a predetermined temperature $T_b$, the reduced current level on lead BL is sufficient to slowly increase the temperature level of the switching element. Thus, if a digit is registered in a digit register during the interrogation of one of the other digit registers, such as at time $t_5$, the temperature level of the associated digit register switching element will slowly increase from ambient temperature, as represented by curve D in FIG. 3. Consequently, if another digit is also registered during this interrogation interval, such as at time $t_6$, the two digits will retain their separate identities for subsequent readout.

Upon release of relay TCR, at time $t_7$ in FIG. 3, the current on lead BL returns to a level sufficient again to increase the temperature of the switching elements in other digit registers having digits registered therein. Subsequently, the switching element in the digit register having the second keyed digit registered therein reaches its specific operating temperature $T_o$, as depicted at time $t_8$ in FIG. 3, to initiate interrogation of that digit register. In the illustrative example herein the second digit keyed at subset 101 is the digit "1" which is registered in the first digit register in bank BK1; that is, digit regiter R11. The interrogation of digit register R11 is substantially the same as that above-described in connection with digit register R21. Relay TCR is energized again during the interrogation of register R11, from time $t_8$ to time $t_9$ in FIG. 3, to provide reduced current on lead BL to the other digit registers.

Upon completion of the interrogation of digit register R11 and the consequent release of relay TCR, the temperature of the switching elements in the other digit registers in which digits are registered continues to increase until another element reaches its specific operating temperature to initiate interrogation of the corresponding digit register. This process continues until all of the digit registers having digits registered therein have been interrogated. The digits are thus read out of the various digit registers in the same order as operation of the corresponding switching elements is initiated—that is, the order of registration of the digits in the digit registers.

After the last digit register having a digit registered therein is interrogated, digit register R101 in the illustrative example, pulse generator 201 is restored to its initial condition. It will be recalled that motor MTR was initially energized, and is maintained energized, by the operation of motor start relay MSR. The locking path for relay MSR is traced through switch 207 of motor time-out device MTO, contact 2 of relay MSR operating to complete a path from ground through heating coil 209 of device MTO, contact 2 of relay MSR, resistor TOR, and break contact 1 of relay TCR to source 206. The current through coil 209 via this path is sufficient to slowly increase the temperature of device MTO toward its specific operating temperature. When the operating temperature of device MTO is reached, switch 207 opens to break the locking path for relay MSR, de-energizing relay MSR and thus motor MTR.

However, each time a digit register is interrogated and relay TCR is energized, break contact 1 of relay TCR operates to interrupt the current through heating coil 209, resulting in a decrease in the temperature of device MTO. The digits are registered and the digit registers are interrogated, each time operating relay TCR, at a rate so as to prevent the temperature of device MTO from reaching a level sufficient to operate switch 207. If an abnormal period of time exists between successively keyed digits, relay TCR may remain de-energized for a period which will permit the current through heating coil 209 to persist until the operating temperature of device MTO is reached. In normal operation, however, the current path through coil 209 is maintained for a period sufficient to effect the operation of switch 207 only after the last digit register has been interrodated and relay TCR released.

It is to be understood that the above-described arrangements are but illustrative of the application of the principles of the present invention. Numerous other arrangements may be devised by those skilled in the art without departing from the spirit and scope of the invention.

What is claimed is:

1. A multidigit register circuit comprising a plurality of digit registers each individually associated with a particular digit value and operable to register a single digit of that value, means for receiving input digits and for selectively operating individual ones of said digit registers in accordance with the digit values of said input digits, readout means individual to each of said digit registers and responsive to the order of registration of said input digits in said digit registers for interrogating said digit registers selectively in said order of registration.

2. A multidigit register circuit in accordance with claim 1 wherein said readout means each comprise time-out means, means responsive to the registration of an input digit in said digit register individual thereto for operating said time-out means, and means operative upon time out of said time-out means for interrogating said individual digit register.

3. A multidigit register circuit in accordance with claim 2 further comprising means for preventing concurrent interrogation of any two of said digit registers.

4. A multidigit register circuit in accordance with claim 3 wherein said preventing means includes means for inhibiting the operation of said time-out means during the interrogation of one of said digit registers.

5. A multidigit register circuit comprising a plurality of digit registers individually associated with particular digit values and operable to register digits of said associated digit values, means for selectively operating individual ones of said digit registers in accordance with the digit values of input digits, means individually associated with each of said digit registers and responsive to the registration of an input digit in said associated digit register for interrogating said associated digit register, and means operative during the interrogation of individual ones of said digit registers and preventing the interrogation of the other ones of said digit registers.

6. A multidigit register circuit comprising a plurality of digit registers each individually associated with a particular digit value and operable to register digits of that value, means for selectively operating individual ones of said digit registers in accordance with the digit values of said input digits, interrogating means individual to each of said digit registers, means individually associated with each of said digit registers and operable in response to the registration of a digit in said individual associated digit register for defining a timing interval, said defining means including means operable upon termination of said timing interval for operating said interrogating means in said individual associated digit register, and means connected to said digit registers operative during the operation of said interrogation means in any one of said digit registers for inhibiting the operation of said defining means in the other of said digit registers.

7. A multidigit register circuit comprising a plurality of digit registers individually operable to register digits of a respective digit value, interrogating means individually associated with each of said digit registers, said individual interrogating means each including time-out means for defining a timing interval and for interrogating said associated digit register upon termination of said timing interval, means responsive to the registration of a digit in a digit register for initiating operation of said time-out means associated with said digit register, and means responsive to the order of registration of digits in individual ones of said digit registers for selectively controlling the duration of said timing interval defined by said time-out means associated with said individual digit registers.

8. A multidigit register circuit comprising a plurality of digit registers individually operable to register digits of a respective digit value, means individual to each of said digit registers operable for interrogating said individual digit registers, said interrogating means including means responsive to the registration of a digit in said individual digit register for initiating a timing interval and for providing an indication upon termination of said timing interval, means responsive to said indication for operating said interrogating means in said individual digit register, and means for selectively controlling the duration of said timing interval in individual ones of said digit registers in accordance with the number of preceding digits registered in other ones of said digit registers which have not been interrogated.

9. A multidigit register circuit comprising a plurality of digit registers each individually associated with a particular digit value and having means for registering a digit of said associated digit value, means interconnecting individual ones of said digit registers associated with the same digit value including means for directing successive digits of the same value to successive ones of said interconnected registers, means including said directing means for preventing the registration of an individual digit in more than one of said digit registers, means individual to each of said digit registers operative for interrogating said individual digit register, and means for operating said interrogating means, selectively in the same order as the order of operation of said registering means in said digit registers.

10. A multidigit register circuit comprising a plurality of digit registers individually operable to register input digits, said digit registers arranged in banks each associated with a respective input digit value, means providing input digits to said digit register banks in accordance with the respective values of said digits, means for directing successive input digits of the same digit value to successive ones of said digit registers in said bank associated with said digit value, readout means individual to each of said digit registers and operative after a predetermined timing interval to read out an input digit registered in said individual digit register, means responsive to the registration of an input digit in one of said digit registers for initiating operation of said readout means individual to said one digit register to define said predetermined timing interval, and means responsive to the operation of said readout means individual to one of said digit registers for increasing said timing interval defined by each of the other of said readout means for which operation has been initiated, thereby precluding operation of more than one of said readout means at a time.

11. A multidigit register circuit comprising a plurality of digit registers each individually associated with a particular digit value and including means for registering digits of said associated digit value, means individually associated with each of said digit registers for interrogating said individual digit registers, means including delay means responsive to the registration of digits in said individual digit registers for selectively operating said associated interrogating means, said delay means defining a delay interval between the registration of a digit in one of said digit registers and the operation of said interrogating means associated with said one digit register, and means for controlling said delay interval defined by each of said delay means in accordance with the number of said digit registers having digits registered therein.

12. A multidigit register circuit in accordance with claim 11 wherein said means including delay means comprises a thermally activated device individually associated with each of said digit registers and having a heating element and a switch, means responsive to the registration of a digit in said associated digit register for energizing said heating element, said switch operating said interrogating means associated with said digit register upon said heating element reaching a predetermined temperature.

13. A multidigit register circuit in accordance with claim 12 wherein said controlling means comprises variable impedance means connected in circuit with said heating elements, said impedance means being normally in a low impedance state, and means operative during the interrogation of each of said digit registers for placing said impedance means in a high impedance state.

14. A multidigit register circuit comprising a plurality of digit registers individually operable to register digits of a respective digit value, means for providing a series of input digits to said digit registers, means for directing each of said input digits to individual ones of said digit registers in accordance with the respective digit values of said input digits, interrogating means individually associated with each of said digit registers, means individual to each of said digit registers responsive to the registration of an input digit in said individual digit register for initiating a timing interval, means individually assocated with each of said initiating means operative upon termination of said timing interval for operating said interrogating means associated with said individual digit register, and means for controlling the duration of said timing interval for individual ones of said digit registers in accordance with the number of preceding digits in said series of input digits registered in other ones of said digit registers.

References Cited by the Examiner

UNITED STATES PATENTS

| | | | |
|---|---|---|---|
| 2,767,248 | 10/1956 | Warman | 179—18 |
| 2,792,533 | 5/1957 | Richards | 200—122 X |
| 3,231,675 | 1/1966 | Riddell | 179—18 |

References Cited by the Applicant

UNITED STATES PATENTS 2,792,533 5/1957 Richards.

KATHLEEN H. CLAFFY, *Primary Examiner.*

ROBERT H. ROSE, *Examiner.*

L. A. WRIGHT, *Assistant Examiner.*